United States Patent [19]

Gau

[11] 3,830,104
[45] Aug. 20, 1974

[54] VORTEX SWIRL FLOWMETER SENSOR PROBE
[75] Inventor: Leonard P. Gau, Birmingham, Mich.
[73] Assignee: Chrysler Corporation, Highland Park, Mich.
[22] Filed: Mar. 30, 1973
[21] Appl. No.: 346,514

[52] U.S. Cl. .................. 73/194 B, 73/204
[51] Int. Cl. .................... G01p 5/10, G01p 5/14
[58] Field of Search ............ 73/194 B, 194 C, 204

[56] References Cited
UNITED STATES PATENTS
3,691,830  9/1972  Tomota et al. ................ 73/194 B FOREIGN PATENTS OR APPLICATIONS
1,391,867  2/1965  France .................................. 73/204

Primary Examiner—James J. Gill
Attorney, Agent, or Firm—Talburtt & Baldwin

[57] ABSTRACT

A vortex swirl flowmeter sensor probe having a thermal-electric sensor member is positioned outside of the fluid flowing through the meter. The probe is responsive to vortex swirls as they pass normal to the ends of a pair of tubular conduits extending normally into the fluid flow. Puffs of fluid flow along the conduit and impinge on the sensor thereby providing a heating and cooling cycle on the sensor.

10 Claims, 5 Drawing Figures

PATENTED AUG 20 1974  3,830,104
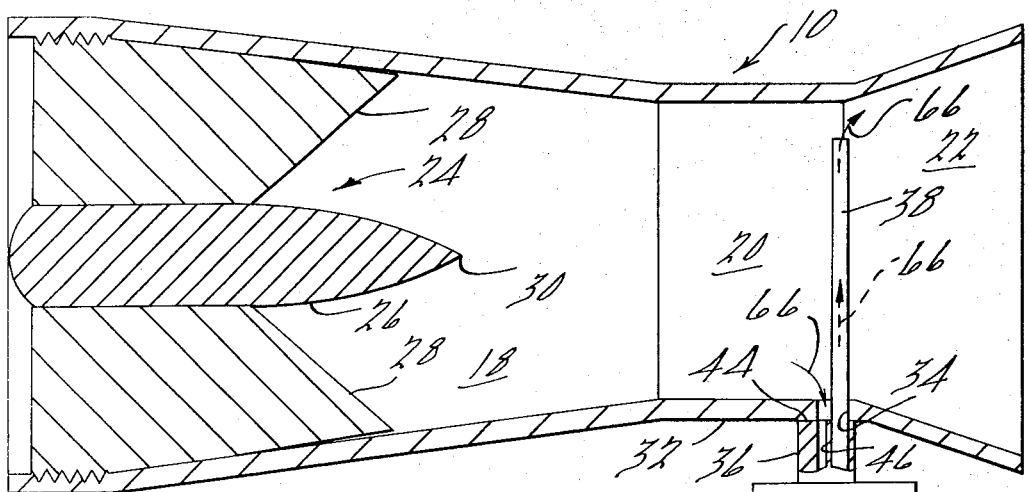
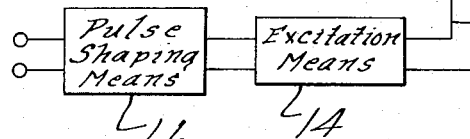
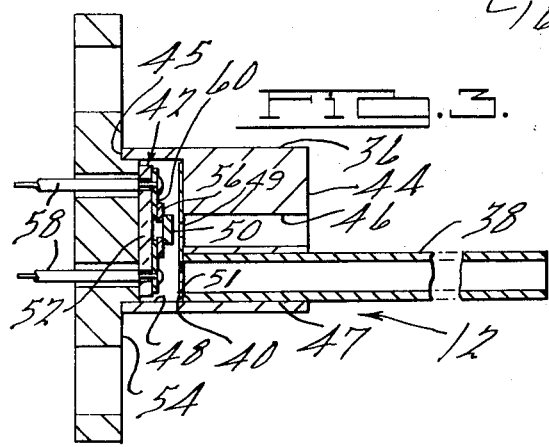
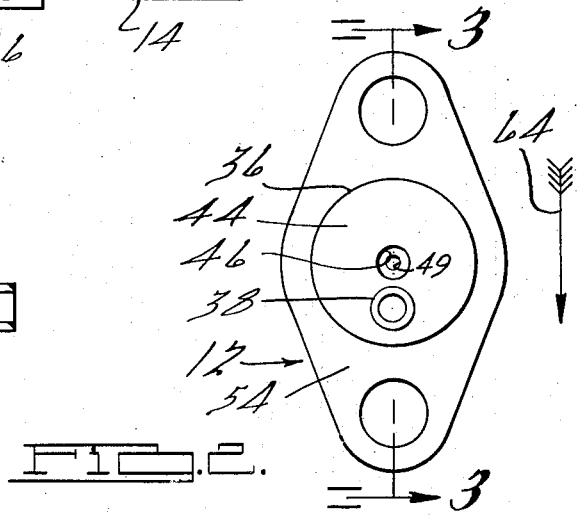
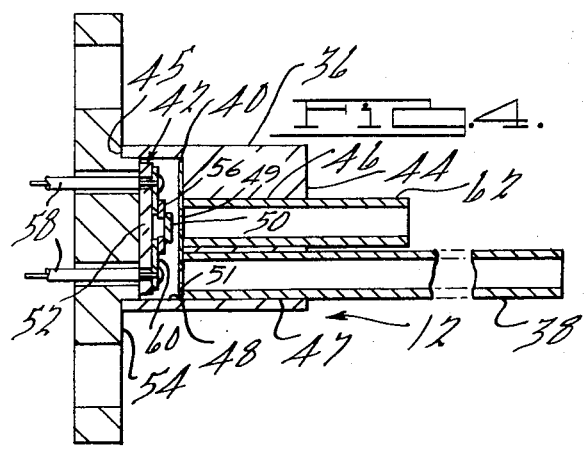
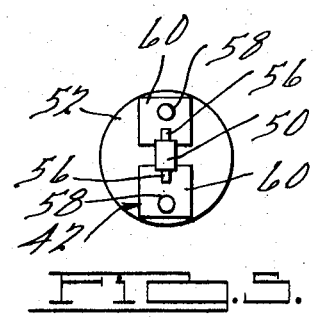

3,830,104

VORTEX SWIRL FLOWMETER SENSOR PROBE

BACKGROUND OF INVENTION

1. Field of Invention

This invention relates to a fluid flowmeter system in general and in particular to fluid flow measuring probes therefor.

2. Prior Art

The background necessary for understanding the principles and phenomenon related to the operation of a fluid flowmeter system may be found in Chanaud U.S. Pat. Re. 26,410 and Chanaud U.S. Pat. No. 3,370,463. Briefly, the function of the fluid flowmeter is to force the fluid whose flow rate is to be measured to assume a swirl vortex component, by converting hydrostatic or pressure energy into kinetic energy. The swirling fluid then precesses at a rate proportional to the fluid flow rate. The fluid enters into the inlet or upstream end of the meter where it is caused to assume a swirl condition. The swirling fluid then flows through a constant size conduit or measuring section until it is directed to flow into an enlarged outlet or downstream section of the meter.

The increase in the cross-sectional area of the flowmeter causes the low pressure center of the swirling fluid to precess about the center line or major axis of the fluid flow path at a discrete frequency tracing a conical-shaped path beginning in the measuring section just upstream from the enlarged outlet section and continuing into the outlet section. This precession of the low pressure center is at a frequency that is proportional to the volumetric flow rate of the fluid flow.

In prior art systems, several different types of probes, for measuring volumetric flow, have transducers, placed in the stream of the fluid, which are responsive to pressure, or velocity or temperature of the fluid. Electrical circuitry connected to the output of the transducers are responsive to the cyclic signal generated by these transducers, count each cycle and totalize the count over a period of time for generating a figure that is proportional to the rate of fluid flow. A variety of such transducers as applied to the conduit wall of the meter are illustrated in Re. 26,401.

Another prior art development is a pair of diametrically opposite transducers placed in the flowmeter. It is known that the pulses due to the precessing swirl will be substantially out of phase by 180° while the pulses due to extraneous pulsations will assume other phases at any given time at both transducers. The outputs of each of these transducers are combined in a differential amplifier where the extraneous pulsations being in phase are cancelled and the precessing swirl pulses being out of phase will be added. Such a transducer probe system is illustrated in U.S. Pat. No. 3,314,289.

SUMMARY OF INVENTION

It is a principle object of this invention to provide a probe for measuring the perturbations which represent the rate of fluid flow in a flowmeter system wherein the sensor develops an electrical signal having a high signal to noise ratio.

It is another object of this invention to provide a probe that is efficient, reliable and yet inexpensive to manufacture.

These and other objects will become apparent from the following drawings, detailed description and claims of a vortex swirl flowmeter sensor probe for measuring the rate of fluid flow in a swirl flowmeter. The swirlmeter is a three-section meter wherein the first section has a conical converging inlet section having fluid swirl means positioned therein. The second section is a cylindrical measuring section having a cross-sectional area equal to the smallest cross-sectional area of the first section and is connected thereto. Located in the wall of the measuring section is an aperture for receiving a measuring probe. The third section connected to the discharge end of the second section is a conical diverging outlet section.

The measuring probe includes a housing member having a pair of spaced broadsides one of which is secured to the wall of the measuring section. A pair of parallel tubular cavities extend from the one broadside in alignment with the aperture in the cylindrical wall and through the housing member toward the other broadside. These two parallel cavities terminate in an enlarged cylindrical cavity that is open to the other broadside. An elongated tubular member open at each end, has one end inserted in one of said cavities and extends through the aperture in the measuring section wall into the path of the fluid flow.

An orifice member is positioned at the end of the enlarged cavity adjacent to the tubular cavities having the aperture in the orifice member in axial alignment with the other tubular cavity. Supported in the cylindrical cavity and normal to the axis of the other tubular cavity is a thermal-electric sensor member responsive to flow fluctuations in the fluid between the two parallel cavities as a result of the pressure differential between the end of the elongated tubular member in the fluid flow and the end of the other cavity adjacent the cylindrical wall. The sensor generates a pulsating signal that is proportional to the rate of fluid flow through the meter.

DESCRIPTION OF THE DRAWINGS

In the drawings:

FIG. 1 is a schematic of a flowmeter system embodying the measuring probe of the present invention;

FIG. 2 is an end view of the probe of the present invention;

FIG. 3 is a plan sectional view taken along line 3—3 of FIG. 2;

FIG. 4 is a plan sectional view of a modification of the measuring probe of FIG. 3;

FIG. 5 is a plan view of the sensor of the probe.

DETAILED DESCRIPTION

Referring to the Figs. by the characters of reference, there is illustrated in FIG. 1 a schematic of a fluid flow metering system. As illustrated, the system comprises a swirl flowmeter 10, a measuring probe 12, an excitation means 14 and a pulse shaping means 16. Such a system may be used, for example, in motor vehicle applications for measuring the rate of air flow into the air cleaner for eventual use to support combustion by the internal combustion engine.

The flowmeter 10, as illustrated in FIG. 1, comprises three substantially hollow sections; a first section or converging conical inlet section 18; a second section or a cylindrical measuring section 20; and a third section or diverging conical outlet section 22. Each of these sections is fastened or secured together to form a unitary structure and may, in fact, be a molded unitary structure.

In the preferred embodiment, the three sections 18, 20 and 22 are molded as an integral unit thus avoiding the need for any fastening together of the sections. In the first section 18, which is the inlet section to the flowmeter 10, there is positioned at the entrance a swirl means 24 such as that illustrated, an axial bullet-nosed portion 26 surrounded by a plurality of equally spaced vanes 28. The bullet-nose portion 26 is positioned with its apex 30 pointing in the direction of air flow. Each of the vanes 28 is inclined to the longitudinal axis of the flowmeter 10 at an acute angle.

The peripheral shape of the first section 18 as previously indicated, is that of a frustum of a cone. The second section 20 is a tubular cylindrical member wherein its cross-sectional area is equal to, or slightly greater than, the smallest cross-sectional area of the first section 18. The third section 22 takes the peripheral shape of a diverging frustum of a cone wherein its smallest cross-sectional area is likewise equal to, or slightly greater than, the cross-sectional area of the second section 20. Located in the cylindrical wall 32 of the second section 20 is an aperture 34 of such size and shape to receive the measuring probe 12 of the present invention. This aperture 34 is located at or near the junction of the second 20 and third 22 sections.

The probe 12 in the preferred embodiment as illustrated in FIGS. 2 and 3, comprises a housing member 36, at least one tubular member 38 extending from the housing member, an orifice member 40 positioned within the housing member, and in a predetermined relationship with the tubular member, and a sensor 42 likewise positioned and sealed within the housing member and likewise in a predetermined relationship with the tubular member.

The housing member 36 as illustrated in FIG. 3 has a pair of spaced broadside surfaces 44–45, one of which 44 is positioned in contact with the outside wall 32 of the second section 20 of the flowmeter 10 as illustrated in FIG. 1. A pair of parallel adjacent cylindrical cavities 46–47 extended within the member 36 from the one broadside 44 which will be positioned in contact with the flowmeter 10, and terminate in a plane which is intermediate to the two broadsides. Alternatively, the two cavities may be formed as one cylindrical cavity. Extending within the housing 36 from the other broadside surface 45 is an enlarged cylindrical cavity 48 which extends to intersect the plane of termination of the two parallel cavities. Into this cavity 48 is positioned, in a spaced apart relationship, the sensor 42 and the orifice member 40. The apertures 49 and 51 in the orifice member 40 are axially in line with the longitudinal axis of the cylindrical cavities 46–47.

Supported in the one cylindrical cavity 47 is an open-ended tubular member 38. This tubular member 38 extends longitudinally from the housing 36 for a predetermined distance which is a function of the cross-sectional area of the second section 20 of the flowmeter 10. If, as illustrated in FIG. 1, this second section 20 is a circular tubular cylinder, the tubular member 38 is of such a length to extend into the cylinder a distance equal to approximately 80 percent of its internal diameter.

The sensor 42 comprises a sensing element 50 supported on a substrate 52 which, in turn, is mounted to a header cap 54 and sealed within the enlarged cylindrical cavity 48. The sensing element 50 is a silicon chip having a positive temperature co-efficient characteristic. The silicon chip 50 is rectangular in shape and is positioned so that one broadside surface is normal to the axis of the other cylindrical cavity 46. In addition, the chip 50 is spaced from the orifice member 40 a distance which is inversely proportional to the diametrical size of the aperture in the orifice member.

The chip 50 is mounted to the substrate by at least two strip leads 56 which are bonded in a spaced apart relationship to the other normal broadside surface of the chip. In the preferred embodiment, the strip leads 56 are each positioned along each of the shorter sides of the rectangular chip 50. The other end of each of the strip leads 56 is secured to a separate conductor 60 on the substrate 52. Each substrate conductor, additionally, has a wire lead 58 bonded thereto for connection to the excitation means 14. As will thereinafter be shown, the silicon chip 50 is responsive to periodic variations in fluid flow to effectively change its electrical resistance thereby generating a pulsating electrical signal in response to the excitation current from the excitation means 14.

FIG. 4 illustrates a modification of the probe of FIG. 3 in that in the other cylindrical cavity 46 there is supported a second open-ended tubular member 62. This tubular member 62 extends longitudinally from the housing 36 for a predetermined distance that is substantially less than the first tubular member 38. The second tubular member 62, similar to the first member, has both of its ends open and substantially the same internal cross-section area. However, this member 62 will extend into the cylindrical measuring section 22 a distance equal to approximately 20 percent of the cross-sectional diameter of the section. This modification improves the amplitude of the signal generated by the sensor 50 by having the amplitude variations from peak to peak more uniform for a given flow rate.

In the plan views of FIGS. 2 and 4, the preferred orientation for positioning the probe 12 in the flowmeter 10 is to have the direction of flow normal to the axis of the other cylindrical cavity 46 and then normal to the axis of the first tubular member 38. In FIG. 2, this direction is indicated by the directional arrow 64 to the right of the Fig. While this is a preferred orientation, the probe 12 is relatively unaffected by other orientation inasmuch as there are no apertures in the side walls of the tubular members 38 and 62 as in prior art probes.

In the operation of the probe 12, as previously stated, a low-pressure center is formed by the swirl means 24 and is caused to precess along a helical path as the fluid approaches and flows into the third section 22. The frequency at which these centers, which are equally spaced apart in the flow, pass the probe 12 is related to the rate of fluid flow through the flowmeter 10. In essence, each pressure center, as it passes the other tubular cavity 46 sends a "puff" or pulse of fluid flowing down the tubular cavity. At the same time, the end of the first tubular member 38 is at a lower pressure thereby creating a pressure differential across the open outward ends of the cavities and/or tubular member. The direction of fluid flow is indicated by the small arrows 66 in FIG. 1.

These puffs or pulses of fluid such as air, actually cool the sensor 50 as they impinge thereon. The sensor 50 is heated to a predetermined stabilized temperature by means of an excitation current that is applied thereto through the wire leads 58. The positive temperature co-efficient characteristic of the silicon chip 50 indicates that as the temperature of the chip is decreased, the resistance is also decreased.

Ideally, the chip 50 would be suspended in heat transferless manner such that the chip may be heated to a predetermined operating temperature and not be required to heat the surrounding environment. However, the medium would have to allow the variation in the fluid flow as represented by puffs of air flowing along the tubular member 62 or cavity 46 to impinge on the chip 50. Since the chip must be supported, the least amount of support necessary would be preferred or if in the use of the probe, vibrations are great, then the support must be one that does not require large amounts of power to change its temperature.

It is with these criteria that the substrate 52 material for the sensor 42 is a low thermal conductivity material and, therefore, the sensor may be heated to a predetermined operating temperature with a very small amount of power from the excitation means. The operating temperature of the chip 50 is greater than the temperature of the fluid being measured permitting a greater change in temperature of the chip in response to the puffs of air impinging thereon.

The sensor 42 is electrically connected in circuit as illustrated in the copending patent application filed on Mar. 30, 1973 and having Ser. No. 346,513 and entitled "Vortex Swirl Flowmeter Sensor Circuit" by W. R. Kissel and assigned to a common assignee in a bridge input to an operational amplifier. As the chip 50 is cycled between a heated and cooled condition, the output of the excitation means 14 correspondingly changes.

The aperture 49 in the orifice member 40 functions to focus the fluid flow onto the broadside surface of the chip 50. A modification, not shown, would provide a diverging flared orifice, similar to a countersink, to the aperture from the chip side of the member to spread and diffuse the puff of fluid or air over the whole surface of the chip and not on the substrate.

The substrate 52 material as previously indicated is a material having a low thermal conductivity characteristic. One such material is zirconium oxide. Other materials which are acceptable are glass and lava. An unacceptable material is found to be beryllium oxide inasmuch as it results in a signal that is 5 to 10 times less than when zirconium oxide is used. A substrate material should have a thermal conductivity characteristic equal to or less than 0.01 calories per sec per degree Centigrade per square centimeter per centimeter, (0.01 Cal/sec/°C/CM²/CM).

As previously indicated, the silicon chip 50 is mounted to the substrate 52 by at least two strip leads 56. Referring to FIG. 5, there is illustrated the two strip leads, one from each short side of the chip. The lead on each side provides a path for the signal and excitation current to flow from the substrate conductor 60 through the chip 50. The size of the leads is held to a minimum to reduce the transfer of heat from the leads to the surrounding fluid and thereby affecting the quality of the electrical signal generated by the chip. In addition to the character of the leads, the physical size of the chip 50 is maintained to a length width ratio of approximately 3:1 thereby optimizing the signal output. A size that is smaller will give a weaker signal and a larger size will generate a signal that is less uniform and electrically "clean" therefore requiring more circuit components in order to develop a usable output signal.

There has thus been shown and described a vortex swirl flowmeter sensor probe for use in a swirl meter. The probe has its sensing element positioned outside of the swirl meter and interconnected thereto by means of a pair of tubular conduits inserted into the fluid flow.

What is claimed is:

1. In a fluid flow system, a probe for measuring the rate of fluid flow said probe comprising:
   a housing having a cavity open at one end thereof to one broadside of said housing;
   means substantially parallel to said one broadside of said housing dividing said cavity into an outer cavity open to said one broadside and an inner cavity, said means having first and second spaced apart apertures therein for fluid communication between said outer and inner cavities;
   a first open-ended tubular member axially in line with said first aperture and having a cross sectional area less than the cross sectional area of said outer cavity and equal to or less than the cross sectional area of said first aperture, said tubular member extending longitudinally beyond said one broadside of said housing; and
   a second open-ended tubular member positioned in said cavity axially in line with said second aperture, said tubular member having a length unequal to the length of said first tubular member and extending parallel to said first tubular member; and
   a solid state sensing means mounted on low thermal conductive substrate means and positioned in said inner cavity and having control leads extending outside of said housing, said sensing means axially in line with and spaced from said second aperture on said dividing means and responsive to variations of fluid flowing through said second aperture impinging thereon and exhausting through said first aperture and said tubular member for generating an electrical signal indicating the rate of fluid flow.

2. The probe according to claim 1 wherein said second tubular member is flush with the one broadside of said housing means.

3. The probe according to claim 1 wherein said sensor means is a positive temperature co-efficient silicon chip supported on a low thermal conductivity substrate.

4. In a swirl flowmeter having a conical converging inlet section with fluid swirl means positioned therein, a cylindrical measuring section having an aperture in the cylindrical wall thereof and a diverging output section, a fluid flow measuring probe comprising:
   a housing member having a pair of spaced broadsides and secured to the outside of the cylindrical wall of the measuring section along one of said broadsides overlying the aperture, said housing member having first and second parallel cylindrical cavities opened to and extending from the broadside adjacent the aperture to a plane intermediate the broadsides and an enlarged cylindrical cavity extending from said plane and opening to the other broadside, said parallel cavities open for fluid communication with said enlarged cavity;

an elongated tubular member open at each end and having one end inserted in said first parallel cylindrical cavity and the other end for extending through the aperture of the measuring section of the flowmeter and into the fluid flowing through the meter;

an orifice member positioned at the end of said second parallel cylindrical cavity adjacent said enlarged cavity, an orifice in said member being in axial alignment with said second parallel cavity; and a thermal-electric sensor member supported in said enlarged cavity aligned with said orifice, said sensor changing its electrical resistance in response to flow fluctuations in the fluid flowing in said first and second parallel cavities as a result of the pressure differential between said other end of said tubular member and the end of said second parallel cavity adjacent to the aperture in the measuring section of the flowmeter for generating an electrical signal indicating the rate of fluid flow through the flowmeter.

5. A fluid flow measuring probe according to claim 4 wherein said thermal-electric sensor is a silicon chip supported on a low thermal conductivity substrate.

6. A fluid flow measuring probe according to claim 5 wherein said silicon chip is a rectangular shaped chip having one broadside surface normal to and centrally located about the axis of said second parallel cavity and spaced from said orifice member a distance proportional to the size of said orifice.

7. A fluid flow measuring probe according to claim 6 wherein said silicon chip has at least two strip leads each bonded at one end to said one broadside surface in a spaced apart relationship and bonded at the other end to said substrate.

8. A fluid flow measuring probe according to claim 5 wherein said substrate has a thermal conductivity characteristic equal to or less than .01 calorie/second-/degree Centigrade/square centimeter/centimeter.

9. A fluid flow measuring probe according to claim 4 wherein said probe is positioned in the flowmeter so as to have said tubular member positioned downstream as respects the flow of the fluid in the meter from said other parallel cavity.

10. A fluid flow measuring probe according to claim 4 further including a second tubular member positioned in said other parallel cavity and extending through the aperture in the flowmeter into the flow of fluid through said meter a distance substantially less than said first tubular member.

* * * * *

UNITED STATES PATENT OFFICE
CERTIFICATE OF CORRECTION

Patent No. 3,830,104    Dated October 11, 1974

Inventor(s) LEONARD P. GAU

It is certified that error appears in the above-identified patent and that said Letters Patent are hereby corrected as shown below:

Column 6, line 37, cancel beginning with "axially in line with and spaced from said second aperture" to and including "on" in line 39, and insert in place thereof --positioned in the path of fluid flow between said apertures in--.

Column 6, line 40, cancel beginning with "said second aperture impinging thereon and exhausting through said first "through and including" aperture and said tubular member" in line 42, and insert in place thereof --one of said apertures and impinging thereon from either one of said tubular members and exhausting through the other of said apertures and the other of said tubular members--.

Signed and sealed this 3rd day of December 1974.

(SEAL)
Attest:

McCOY M. GIBSON JR.
Attesting Officer

C. MARSHALL DANN
Commissioner of Patents